(12) United States Patent
Turner et al.

(10) Patent No.: US 7,012,889 B1
(45) Date of Patent: Mar. 14, 2006

(54) METHOD AND APPARATUS FOR CONTROLLING INPUT RATES WITHIN A PACKET SWITCHING SYSTEM

(75) Inventors: Jonathan S. Turner, St. Louis, MO (US); Zubin D. Dittia, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1126 days.

(21) Appl. No.: 09/705,450

(22) Filed: Nov. 2, 2000

(51) Int. Cl.
*H04L 12/26* (2006.01)

(52) U.S. Cl. ............... 370/229; 370/232; 370/253; 370/413

(58) Field of Classification Search ............ 370/253, 370/229–236, 412–418, 252, 395.4, 465, 370/468
See application file for complete search history.

(56) References Cited

U.S. PATENT DOCUMENTS

| | | | |
|---|---|---|---|
| 4,491,945 A | 1/1985 | Turner |
| 4,494,230 A | 1/1985 | Turner |
| 4,630,259 A | 12/1986 | Larson et al. |
| 4,630,260 A | 12/1986 | Toy et al. |
| 4,734,907 A | 3/1988 | Turner |
| 4,745,593 A | 5/1988 | Stewart |
| 4,829,227 A | 5/1989 | Turner |
| 4,849,968 A | 7/1989 | Turner |
| 4,893,304 A | 1/1990 | Giacopelli et al. |
| 4,901,309 A | 2/1990 | Turner |
| 5,027,342 A | 6/1991 | Boulton et al. |
| 5,127,000 A | 6/1992 | Henrion |
| 5,161,156 A | 11/1992 | Baum et al. |
| 5,173,897 A | 12/1992 | Schrodi et al. |
| 5,179,551 A | 1/1993 | Turner |
| 5,179,556 A | 1/1993 | Turner |
| 5,229,990 A | 7/1993 | Teraslinna |
| 5,229,991 A | 7/1993 | Turner |
| 5,253,251 A | 10/1993 | Aramaki |
| 5,260,935 A | 11/1993 | Turner |
| 5,265,092 A | 11/1993 | Soloway et al. |
| 5,339,311 A | 8/1994 | Turner |
| 5,402,415 A | 3/1995 | Turner |

(Continued)

OTHER PUBLICATIONS

Zubin Dittia, "Integrated Hardware/Software Design of a High Performance Network Interface," Mar. 2000, Doctor of Science Thesis, Sever Institute of Technology, Washington University, St. Louis, Missouri, 139 pages.

(Continued)

*Primary Examiner*—Frank Duong
*Assistant Examiner*—Robert C. Scheibel, Jr.
(74) *Attorney, Agent, or Firm*—The Law Office of Kirk D. Williams

(57) ABSTRACT

Methods and apparatuses are disclosed for controlling the rate at which packets are sent from a first to a second component of a packet switching system. In one implementation, the first component represents an input line card to a packet switch, and the second component represents an output of the packet switch. In such a system, a state is maintained for each output at each line card. For example, these states may include an unconstrained state during which traffic is sent at a full rate to the output, an off state during which no traffic is sent to the output, and a constrained state during which traffic is sent at a reduced rate to the output. Typically, this reduced rate is proportional to the arrival rate of packets at the input line card which are destined for the output. The state of the output is changed based on received flow control information about the output and whether traffic remains queued for the output at the input line card.

38 Claims, 14 Drawing Sheets

U.S. PATENT DOCUMENTS

| | | | |
|---|---|---|---|
| 5,471,460 A | 11/1995 | Tanabe | |
| 5,475,682 A | 12/1995 | Choudhury et al. | |
| 5,533,020 A | 7/1996 | Byrn et al. | |
| 5,689,500 A | 11/1997 | Chiussi et al. | |
| 5,768,572 A | 6/1998 | George et al. | |
| 5,842,040 A | 11/1998 | Hughes et al. | |
| 5,844,890 A * | 12/1998 | Delp et al. | 370/230 |
| 5,848,227 A | 12/1998 | Sheu | |
| 6,246,665 B1 | 6/2001 | Watanabe et al. | |
| 6,337,851 B1 * | 1/2002 | Charny et al. | 370/232 |
| 6,343,067 B1 | 1/2002 | Drottar et al. | |
| 6,366,557 B1 | 4/2002 | Hunter | |
| 6,411,599 B1 | 6/2002 | Blanc et al. | |
| 6,418,115 B1 | 7/2002 | Iino et al. | |
| 6,424,624 B1 | 7/2002 | Galand et al. | |
| 6,430,150 B1 | 8/2002 | Azuma et al. | |
| 6,526,060 B1 * | 2/2003 | Hughes et al. | 370/395.4 |
| 6,654,342 B1 | 11/2003 | Dittia et al. | |
| 6,674,721 B1 | 1/2004 | Dittia et al. | |
| 6,674,726 B1 * | 1/2004 | Kado et al. | 370/253 |
| 6,728,211 B1 | 4/2004 | Peris et al. | |
| 6,735,173 B1 | 5/2004 | Lenoski et al. | |
| 6,747,972 B1 | 6/2004 | Lenoski et al. | |
| 6,788,689 B1 | 9/2004 | Turner et al. | |
| 6,816,492 B1 | 11/2004 | Turner et al. | |
| 6,826,186 B1 | 11/2004 | Dittia et al. | |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS-96-07, Washington Univeristy, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

U.S. Appl. No. 09/519,282, filed Mar. 7, 2000, Lenoski et al.

U.S. Appl. No. 09/705,395, filed Nov. 2, 2000, Turner et al.

George Varghese and Anthony Lauck, "Hashed and Hierarchical Timing Wheels: Efficient Data Structures for Implementing a Timer Facility," IEEE/ACM Transactions on Networking, vol. 5, No. 6, Dec. 1997, pp. 824-834.

* cited by examiner

METHOD AND APPARATUS FOR CONTROLLING INPUT RATES WITHIN A PACKET SWITCHING SYSTEM

FIELD OF THE INVENTION

This invention relates to communications systems; more particularly, the invention relates to controlling input rates within a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

However, the unpredictable arrival of packets at the inputs of a packet switch can cause congestion, which can in turn lead to poor performance. This is particularly true in systems where the bandwidth of the interface leaving each output line card is much smaller than the aggregate bandwidth of all of the input links entering the system. In such systems, traffic going to congested outputs can disrupt traffic going to uncongested outputs.

While there are many ways to implement packet switches, systems that use output queuing offer the best possible performance and are a standard of comparison against which other systems are measured. In an ideal output queuing system, the interface leading to each output line card has a bandwidth that is at least as large as that of all the input links to the system. This means that arriving packets can go straight to buffers in the output line cards and are not subject to contention from packets going to other outputs.

Unfortunately, the ideal output queuing system has poor scaling characteristics, making it a poor choice for systems with large numbers of links and/or large aggregate throughputs. For large systems, multistage interconnection networks with internal packet buffers offer a more economical alternative. However, in order for such systems to deliver the same performance characteristics as output queuing systems, the flow of traffic to different outputs must be coordinated in an appropriate fashion. In particular, it's necessary to regulate the flow of traffic to each output line card so as not to exceed the bandwidth of the interface to the output line card. In addition, the fraction of an overloaded output line card's input bandwidth allocated to different input line cards should be chosen in such a way that packets for a given output that arrive at input line cards at approximately the same time are delivered to the output line card at about the same time.

SUMMARY OF THE INVENTION

One or more components of a packet switching system include multiple rate monitors to measure the rate at which traffic arrives for each of the outputs of the packet switching system, one or more state data structures indicating a state of each of multiple outputs of the packet switching system, and a rate-controlled virtual output queue for each of the multiple outputs of the packet switching system. Each of the rate controlled virtual output queues adjusts the rate at which packets are sent to a particular destination based at least in part on the measured traffic arrival rate and the state for the particular destination.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
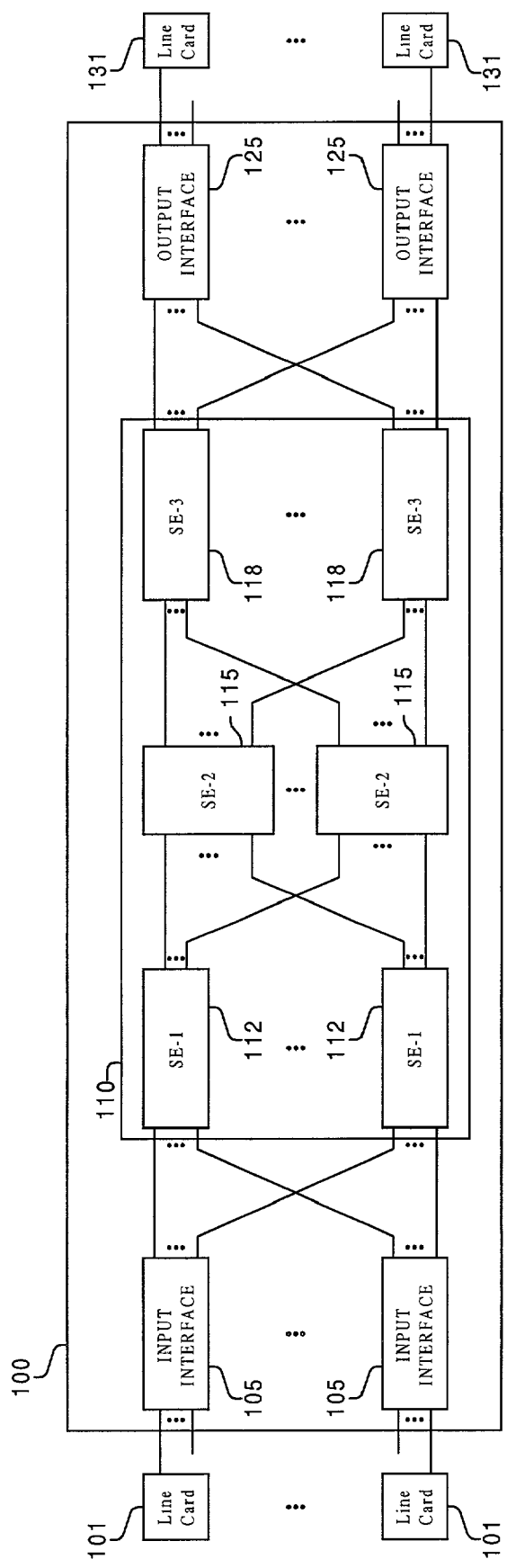
FIGS. 1A–C are block diagrams of a few of many possible embodiments of a switching system.

Methods and apparatuses are disclosed for controlling the rate at which packets are sent from a first to a second component of a packet switching system. In one embodiment, the first component represents an input line card of a packet switch, and the second component represents an output of the packet switch. Such methods and apparatus are not limited to a single packet switching environment. Rather, the architecture and functionality taught herein are extensible to an unlimited number of systems, packet switching environments, and embodiments in keeping with the scope and spirit of the invention. Some embodiments described may include, inter alia, systems, integrated circuit chips, methods, and computer-readable media containing instructions.

A system is described that includes rate monitors that measure the rate at which traffic arrives for each of the outputs of the system and includes a set of rate-controlled virtual output queues at each input line card. In one embodiment, there is one queue for each output of the system. Some embodiments further include a rate assignment mechanism that determines what rates should be assigned to each of the rate-controlled virtual output queues. These rate-controlled virtual output queues also include a mechanism for adjusting the rates at which packets are sent to the outputs of the system. These rate-controlled virtual output queues may include the mechanism for automatically determining and adjusting their sending rates, or receive this information from another source (e.g., another component, external source, etc.). In one embodiment, these sending rates are adjusted based on received flow control information.

The system receives flow control information corresponding to the status of each of the outputs of the system. In one embodiment, the system includes an interconnection network that maintains separate internal buffers for each of the different output links and sends XON and XOFF flow control signals to the input ports as necessary to regulate the flow of packets to different outputs. The ability to control input rates within a system is not limited to any particular flow control scheme. Numerous mechanisms are known in the art for accumulating and distributing flow control information in systems, including those for use in packet switching and other communications systems, and therefore, are not discussed with particularity herein.

In one embodiment, a rate monitor $M(i,j)$ for traffic from input i to output j includes a state machine $S(i,j)$ with three states: unconstrained, off and backlogged. If output j is not congested (e.g., the total traffic going to output j does not exceed the bandwidth of the interface to the output line card) then $S(i,j)$ is unconstrained. $S(i,j)$ goes to the off state whenever the input line card at input i receives a flow control signal turning off traffic to output j. $S(i,j)$ goes from the off state to the backlogged state whenever it receives a flow control signal turning on traffic to output j. $S(i,j)$ goes from the backlogged state to the unconstrained state when the queue at input i for output j becomes empty.

In one embodiment, when $S(i,j)$ is unconstrained (e.g., the output is not congested), packets are sent to output j at their arrival rate. When $S(i,j)$ is off (e.g., the output is in a off state), packets are not sent to output j. When $S(i,j)$ is backlogged (e.g., the output is in a backlogged state), packets are sent to output j at a reduced pacing rate approximately proportional to their arrival rate.

In one embodiment, the rate at which traffic arrives for congested outputs is monitored. One method of doing this is to keep a record of the last time to when the queue at input i for output j was empty and to count the number of packets, c, received since time $t_0$. A measured average arrival rate, $R(i,j)$, at time t is then equal to $c/(t-t_0)$. The pacing rate is then set according to the formula, pacing rate=$f*R(i,j)$, where f is a parameter of the system and is called the acceleration factor. An alternative to measuring the average arrival time from the last time the queue was empty is to measure the average arrival time during successive measurement intervals while the queue remains non-empty. This can be done, for example, by clearing c periodically and at the same time setting to equal to the current time. This approach allows the pacing rate to more quickly adapt to changes in the rate at which traffic arrives. In other embodiments, the pacing rate is determined with additional parameters. For example, in systems which support packets of varying lengths, the pacing rate may be based on the size of the received packets (e.g., total bytes, etc.), rather than, or in addition to a count of packets.

Different embodiments employ various acceleration factors f, which may substantially vary between different systems. Acceleration factor f may be set at system configuration time or may be varied during the operation of the system based on some parameters, such as traffic congestion. In one embodiment, acceleration factor f is related to the speed-up factor of the packet switching fabric over the packet arrival rate. For example, in one embodiment system having a speed-up factor of 1.3, an acceleration factor f of approximately 1.2 is used.

In one embodiment, each input i has a queue for each output and a queue scheduler that determines when packets are sent from each queue. At any point in time, a queue at input i for a backlogged output j is assigned a rate $P(i,j)$ and the queue scheduler sends packets to output j at the assigned rate, whenever $S(i,j)$=backlogged (when $S(i,j)$=off, no packets are sent from input i to output j).

Let $T(i,j)=1/P(i,j)$ be the target time interval between successive packets sent from input i to output j. $T(i,j)$ is expressed in units equal to the time it takes an input line card to send a packet to the interconnection network.

In one embodiment, the queue scheduler is a data structure that comprises a set of "timing wheels." A timing wheel can be implemented as a one-dimensional array of linked lists. Each list contains a set of queue identifiers. The position of a list in the array is used to determine when the queue so identified should next send a packet to the output link. In the simplest case, a single timing wheel is used. In such an embodiment, indicators of outputs are stored in the timing wheel data structure until their scheduled time. At this time, the indicators are removed from the timing wheel data structure and placed in a transmit list. Items are removed from the transmit list and a packet corresponding to the output is sent, with an indicator for the output re-inserted into the timing wheel data structure in an appropriate time bin if packets remain to be sent to the output.

The time bin into which a queue identifier is inserted, is selected to produce the desired rate of transmission from that queue. For each queue, there is a parameter $T(i,j)$ referred to as the inter-packet time for that queue. This parameter gives the average number of packet times between successive cell transmissions from the queue. To enable accurate rate specifications, the inter-packet time may be expressed in time units that are smaller than the time it takes to transmit a single packet. When a queue identifier is re-inserted into a time bin, a target transmission time is computed for the next packet to be sent from that queue. This target transmission time is equal to $T(i,j)$ plus the target transmission time of the previous packet sent from the queue. The queue identifier is re-inserted into that time bin whose contents will be transferred to the transmit list at the time that is closest to the target transmission time.

In one embodiment, each timing wheel also has a cursor which points to one of the lists in the array. The cursors are advanced from one position in the array to the next position in the array as time advances. The cursor for the first timing wheel is advanced at every time step (a time step being the time it takes an input line card to send a packet to the interconnection network). The cursor for the second timing wheel is advanced less frequently, the cursor for the third timing wheel is advanced still less frequently, and so forth. Other embodiments may employ other timing data structures, timing and/or throttling mechanisms, which may include counters, timers, state machines, timestamps, etc.

In addition to the timing wheels, the queue scheduler also contains a transmit list containing identifiers for queues from which packets should be sent as soon as possible. During each time step, if the transmit list is not empty, the first queue identifier in the transmit list is removed from the transmit list, a packet is sent to the interconnection network from that queue and if there are still more packets in the queue that are waiting to be transmitted then the queue identifier is re-entered into the queue scheduler (called scheduling the queue, described below).

In one embodiment, the scheduling of the queue is accomplished as follows.

If $S(i,j)$=unconstrained, then the queue for traffic from input i to output j is scheduled by adding a queue identifier to the end of the transmit list (assuming that the queue is not empty). A previously empty queue is scheduled when a cell arrives for it.

If $S(i,j)$=backlogged, then the queue for traffic from input i to output j is scheduled by placing a queue identifier in one of the lists in one of the timing wheels. Which list it goes into is determined using $T(i,j)$ the allowed time interval between successive packet transmissions. In particular, a target time is determined for when the next packet should be sent, which is the sum of $T(i,j)$ and the target time (not the actual time) for the last packet sent. If the target time for the next packet is x, then a queue identifier is placed into a list that is associated with time x.

A single timing wheel is used in one embodiment. In another embodiment, multiple timing wheels are used. Using multiple timing wheels having different time periods allows the scheduling of a wider range of time values using a reduced amount of memory, while maintaining a fine level of granularity in one of the timing wheels.

One embodiment using multiple timing wheels is now described. Let $N(k)$ be the number of lists in the k-th timing wheel and let $C(k)$ be the cursor advance period for timing wheel k; this parameter specifies how frequently the cursor for timing wheel k is advanced from one list to the next. The range $R(k)$ of a timing wheel k can be determined by the following formula: $R(k)=C(k)*N(k)$.

To schedule a queue for a backlogged destination j, we first determine the target transmission time, x for the queue.

If x−(current time)$\leq$R(1), then we add the queue identifier to the list of queue identifiers in the first timing wheel that is (x/C(1)) positions past the current cursor position for the first timing wheel.

Else if x−(current time)$\leq$R(2) then we add the queue identifier to the list of queue identifiers in the second timing wheel that is (x/C(2)) positions past the current cursor position for the second timing wheel.

Else if x−(current time)$\leq$R(3) then we add the queue identifier to the list of queue identifiers in the third timing wheel that is (x/C(3)) positions past the current cursor position for the third timing wheel, and so on.

Whenever a cursor for a timing wheel is advanced, the list at the current cursor position is transferred to the end of the transmit list.

By using more timing wheels, a larger range of rates can be covered with the same amount of memory in the queue scheduler.

FIGS. 1A–3C and their discussion herein are intended to provide a description of various exemplary packet switching systems. FIGS. 1A–C illustrate the basic topology of different exemplary packet switching systems. FIG. 1A illustrates an exemplary packet switch 100 having multiple inputs and outputs and a single interconnection network 110. FIG. 1B illustrates an exemplary packet switch 140 having multiple interconnection networks 141 and folded input and output interfaces 149. FIG. 1C illustrates an exemplary folded packet switch 160 having multiple interconnection networks 161 and folded input and output interfaces 169. Embodiments of each of these packet switches 100, 140, and 160 control their input rates for packets destined for their outputs in the manners disclosed herein. Of course, the invention is not limited to these illustrated operating environments and embodiments, and the packet switching systems may have more or less elements.

FIG. 1A illustrates an exemplary embodiment of a packet switch 100. Packet switch 100 comprises multiple input interfaces 105, interconnection network 110, and output interfaces 125. Input interfaces 105 and output interfaces 125 are both coupled over multiple links to interconnection network 110. In one embodiment, line cards 101 and 131 are coupled to input interfaces 105 and output interfaces 125. In certain embodiments including other packet switching topologies, line cards or their functionality may be included in the packet switch itself, or as part of the packet switching system.

In one embodiment, interconnection network 110 comprises multiple switch elements SE-1 112, SE-2 115, and SE-3 118 that are interconnected by multiple links. Line cards 101 and 131 may connect to other systems (not shown) to provide data items (e.g., packets) to be routed by packet switch 100. Input rates may be controlled at line cards 101, input interfaces 105 and/or other locations within packet switch 100 or the packet switching system.

Figure 1B:
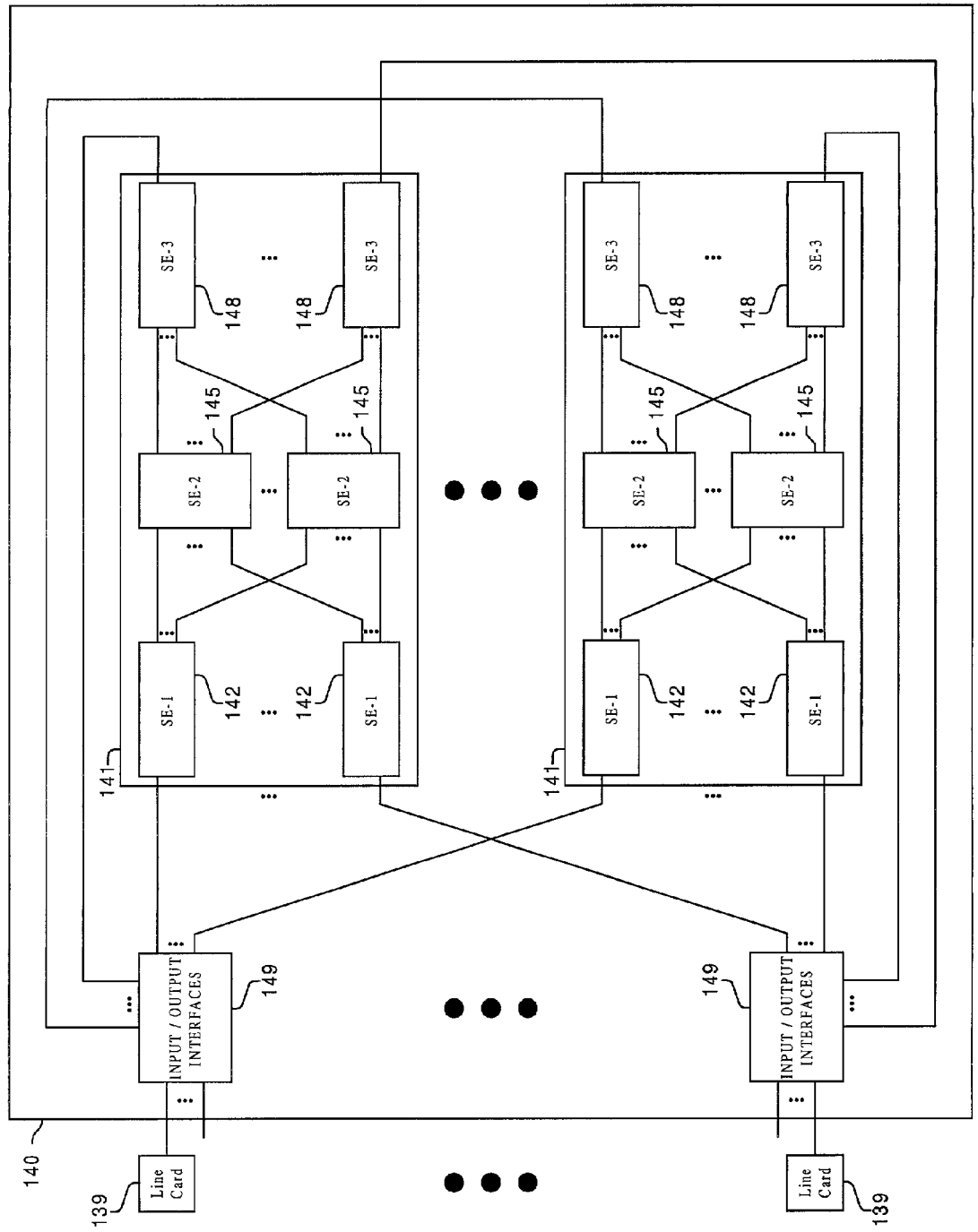

FIG. 1B illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Input rates may be controlled at line cards 139, input and output interfaces 149 and/or other locations within packet switch 140 or the packet switching system.

Figure 1C:
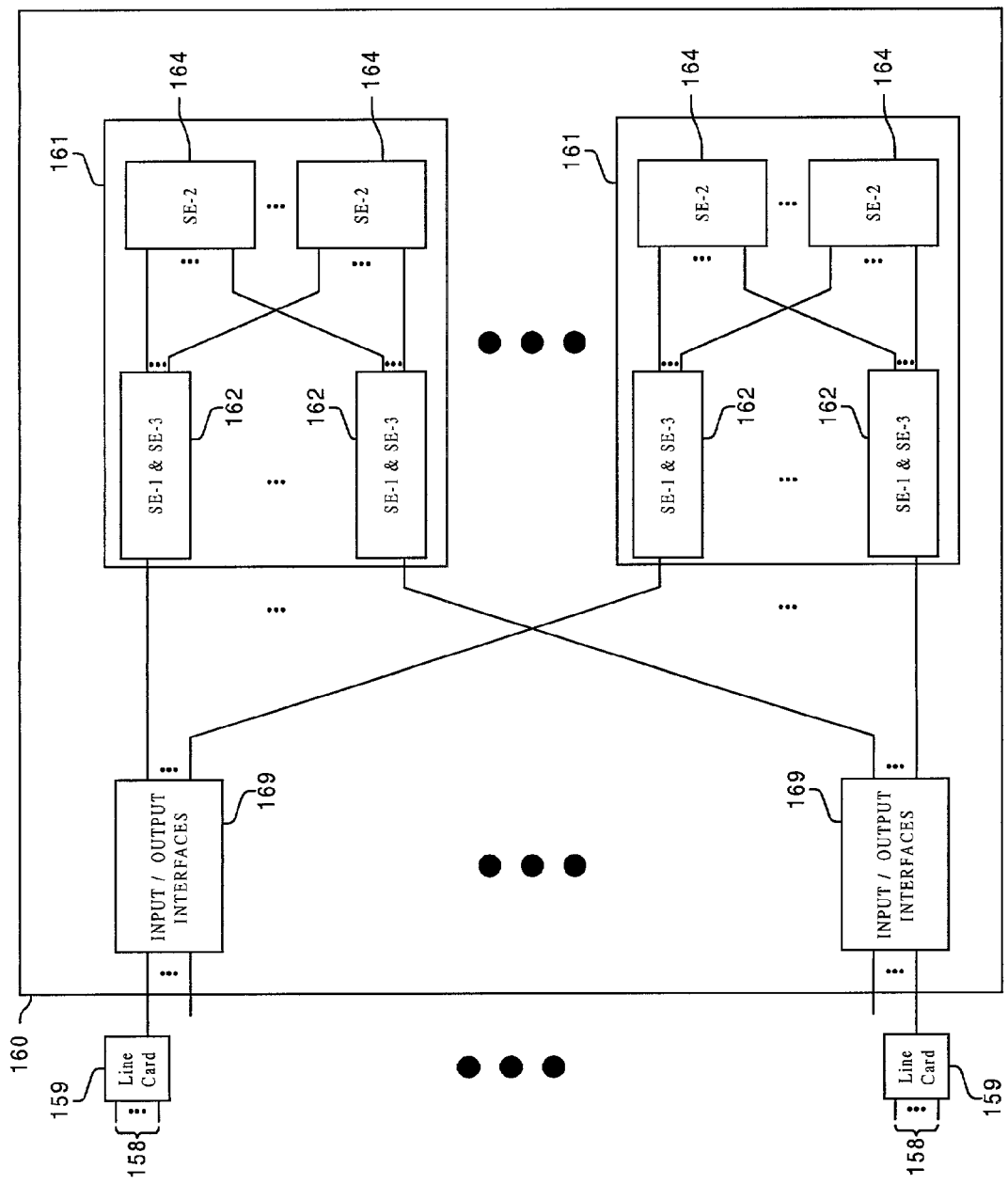

FIG. 1C illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Input rates may be controlled at line cards 159, input and output interfaces 169 and/or other locations within packet switch 160 or the packet switching system.

Figure 2A:
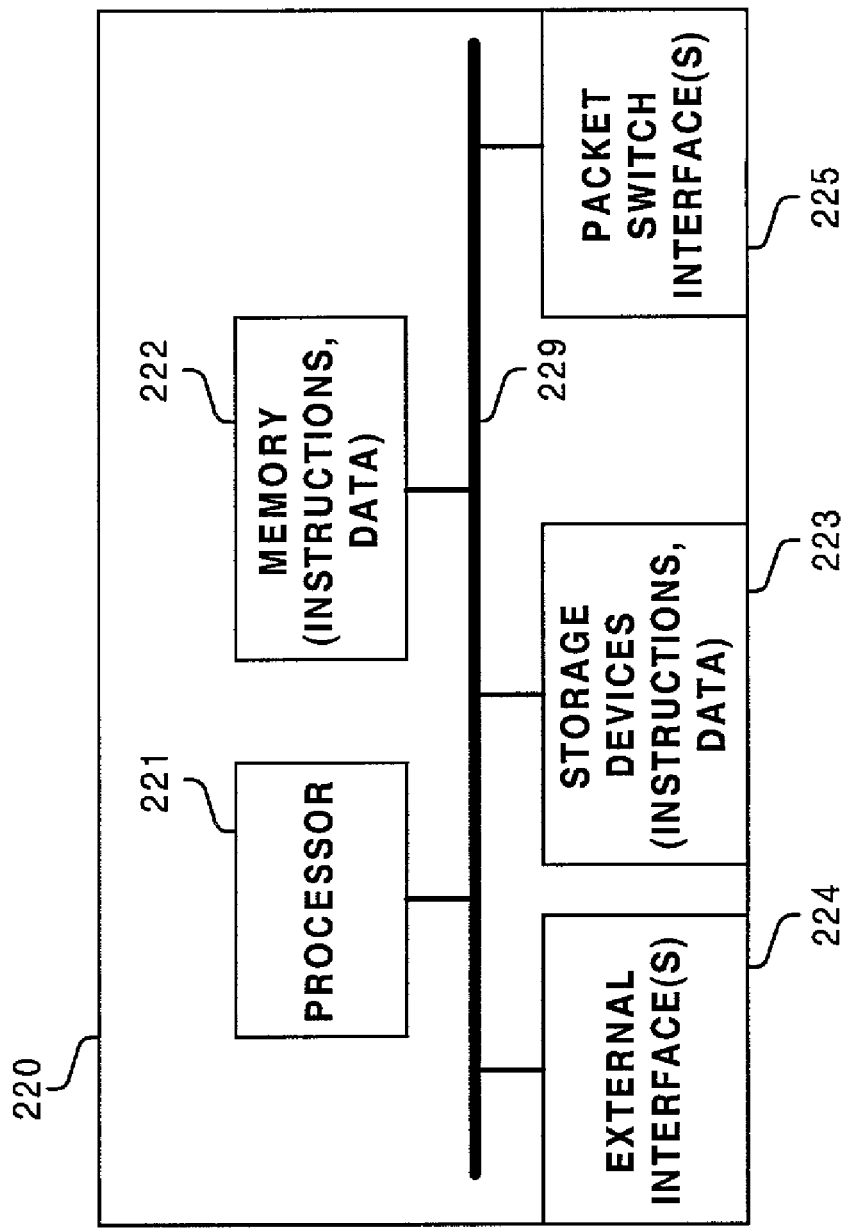
FIGS. 2A–C are block diagrams illustrating exemplary embodiments of a packet switching system component, such as, for example, a line card and/or input/output interface.
Figure 2B:
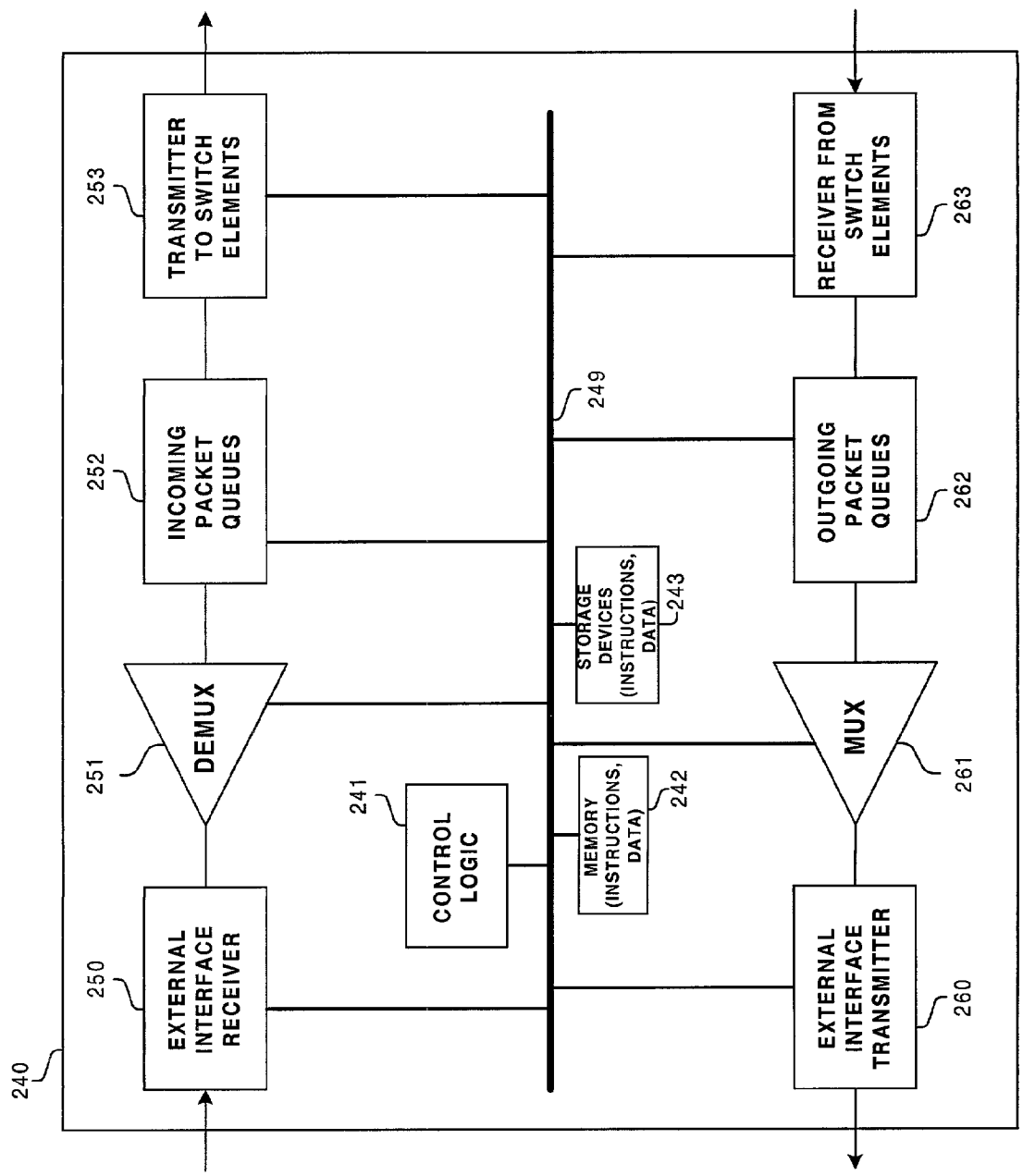
Figure 2C:
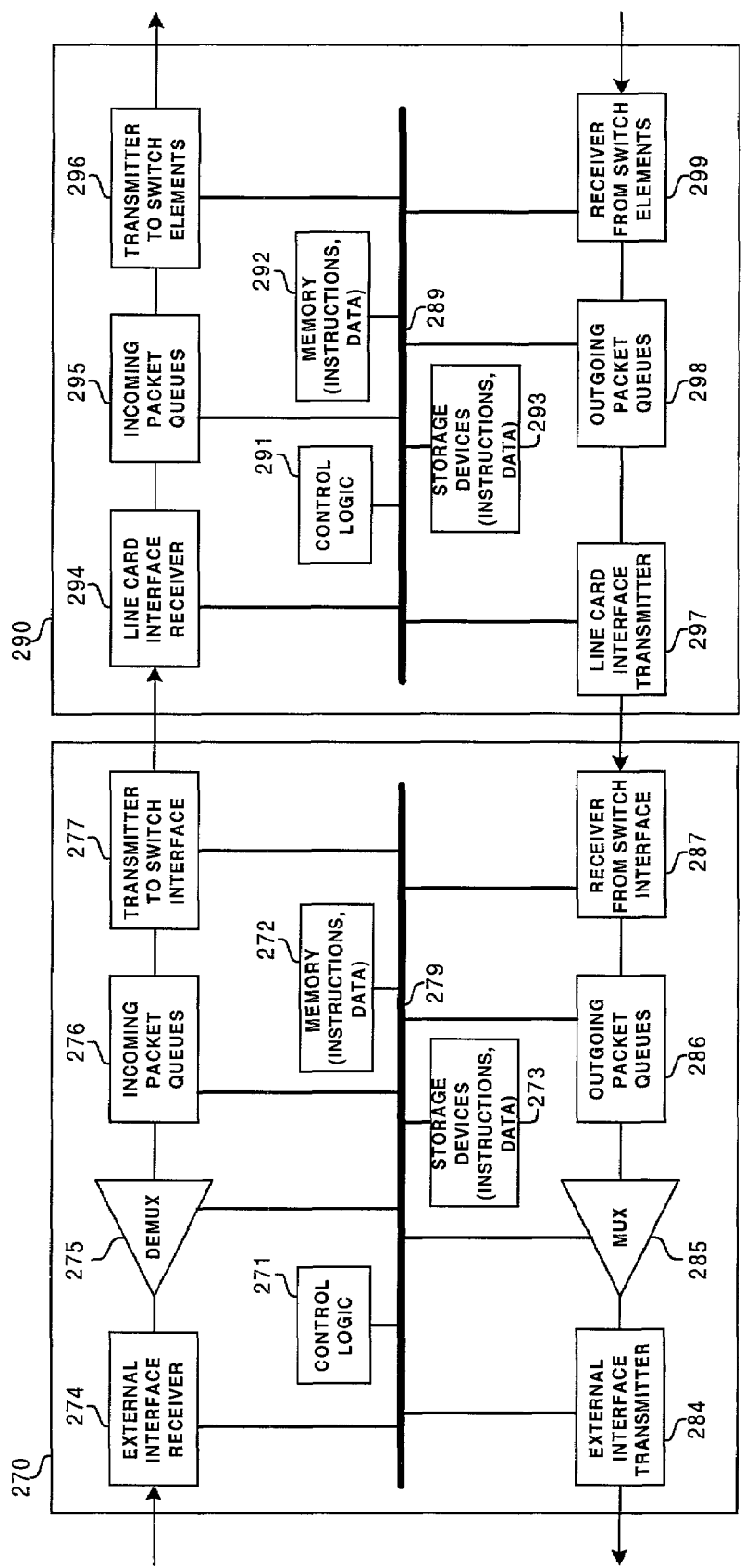

FIGS. 2A–C illustrate three of numerous possible embodiments of a line card, input interface, output interface, and/or input/output interface. For illustrative purposes, only single transmitters and receivers may be shown. Multiple transmitters and receivers may be used to communicate with multiple sources and destinations (e.g., line cards, switch fabrics, etc.).

FIG. 2A illustrates packet switching component 220 comprising a processor 221, memory 222, storage devices 223, and one or more external interface(s) 224, and one or more packet switch interface(s) 225, and one or more internal communications mechanisms 229 (shown as a bus for illustrative purposes). External interface(s) 224 receive and send external signals to one or more communications devices or networks (e.g., one or more networks, including, but not limited to the Internet, intranets, private or public telephone, cellular, wireless, satellite, cable, local area, metropolitan area and/or wide area networks). Memory 222 is one type of computer-readable medium, and typically comprises random access memory (RAM), read only memory (ROM), integrated circuits, and/or other memory components. Memory 222 typically stores computer-executable instructions to be executed by processor 221 and/or data which is manipulated by processor 221 for implementing functionality in accordance with certain embodiments described herein. Storage devices 223 are another type of computer-readable medium, and typically comprise disk drives, diskettes, networked services, tape drives, and other storage devices. Storage devices 223 typically store computer-executable instructions to be executed by processor 221 and/or data which is manipulated by processor 221 for implementing functionality in accordance with certain embodiments of the invention. Packet switching component 220 controls input rates as described herein.

As used herein, computer-readable medium is not limited to memory and storage devices. Rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 2B illustrates packet switching component 240 having a single element providing the functionality of a line card and an input/output interface, for example that of line card 159 and input/output interface 169 (FIG. 1C). FIGS. 2B–C will be described in relation to FIG. 1C for illustrative purposes; however, these embodiments could be used with other packet switch topologies and other implementations and embodiments. Packet switching component 240 comprises control logic 241 implementing functionality in accordance with certain embodiments described herein. In one embodiment control logic 241 includes memory for storage of data and instructions. Control logic 241 is connected to other components of packet switching component 240 via one or more internal communications mechanisms 249 (shown as a bus for illustrative purposes). In one embodiment, control logic 241 includes memory for storing instructions and data. Packet switching component 240 may also includes optional additional memory 242 and storage devices 243. External interface receiver 250 receives external signals, separates the signals into channels using demultiplexor 251 into multiple streams of packets which are temporarily stored in incoming packet buffer 252. At the appropriate time, a packet is sent to the appropriate switch element SE-1 & SE-3 162 via transmitter to switch elements 253. Packets are received from switch elements SE-1 & SE-3 162 at the receiver from switch elements 263 and placed in the outgoing packet buffer 262. Multiplexor 261 extracts the packets and creates a multiplexed signal which is transmitted via external interface transmitter 260. In one embodiment, control logic 241 referencing a data structure within control logic 241 or memory 242, controls input rates as described herein.

FIG. 2C illustrates an embodiment of a packet switching component 270 and a switch interface 290, which could correspond to line card 159 and input/output interfaces 169 illustrated in FIG. 1C.

The embodiment of packet switching component 270 illustrated in FIG. 2C includes control logic 271 implementing functionality in accordance with certain embodiments of the invention. Control logic 271 is connected to other components of line card 270 via one or more internal communications mechanisms 279 (shown as a bus for illustrative purposes). In one embodiment, control logic 271 includes memory for storing instructions and data. Packet switching component 270 also includes optional additional memory 272 and storage devices 273. External interface receiver 274 receives external signals 158 (FIG. 1C), separates the signals into channels using demultiplexor 275 into multiple streams of packets which are temporarily stored in incoming packet buffer 276. At the appropriate time, a packet is sent to switch interface 290 via transmitter to switch interface 277. Packets are received from switch interface 290 at the receiver from switch interface 287 and placed in the outgoing packet buffer 286. Multiplexor 285 extracts the packets and creates a multiplexed signal which is transmitted via external interface transmitter 284. In one embodiment, control logic 271, referencing a data structure within control logic 271 or memory 272, controls input rates as described herein.

The embodiment of input/output interface 290 illustrated in FIG. 2C includes control logic 291 implementing functionality in accordance with certain embodiments of the invention. Control logic 291 is connected to other components of switch interface 290 via one or more internal communications mechanisms 289 (shown as a bus for illustrative purposes). In one embodiment, control logic 291 includes memory for storing instructions and data. Switch interface 290 also includes optional additional memory 292 and storage devices 293. Line card receiver 294 receives packets from packet switching component 270 temporarily stores the packets in incoming packet buffer 295. At the appropriate time, a packet is sent to an appropriate switch element SE-1 & SE-3 162 via transmitter to switch elements 296. Packets are received from switch elements SE-1 & SE-3 162 at the receiver from switch elements 299 and placed in the outgoing packet buffer 298. Line card interface transmitter 297 then forwards these to packet switching component 270. In one embodiment, control logic 291, referencing a data structure within control logic 291 or memory 292, controls input rates as described herein.

Figure 3A:
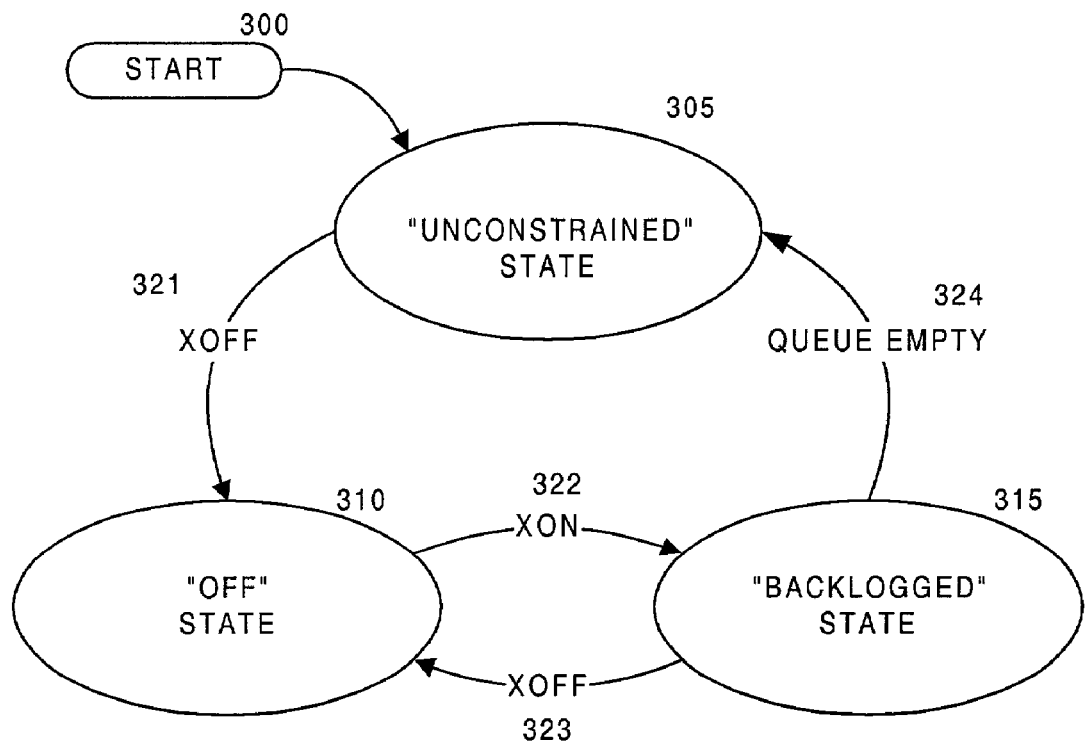
FIG. 3A is a state diagram illustrating a set of states and the transitions between these states for one embodiment.
Figure 3B:
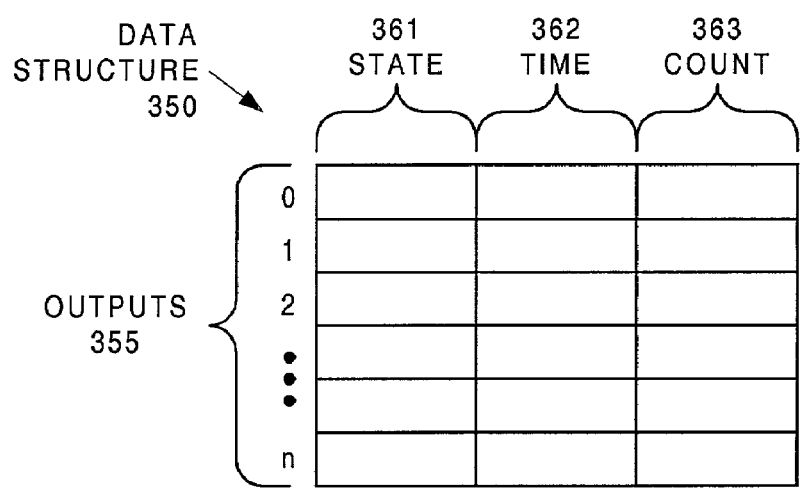
FIG. 3B illustrates a data structure which may be used to maintain state, time and packet count information for each output of a packet switching system.

FIGS. 3A–C illustrates the state diagram for each output of one embodiment. As illustrated, an output can be in an "UNCONSTRAINED" state 305, "OFF" state 310, or "BACKLOGGED" state 315. Initially, processing begins at start state 300 which sets the state of the output to the "UNCONSTRAINED" state 305. In response to a XOFF signal 321 from the destination, the output transitions to the "OFF" state 310. In response to an XON signal 322 from the destination, the output transitions to the "BACKLOGGED" state 315. Then, if an XOFF signal 323 is received, the output transitions to the "OFF" state 310. Otherwise, in response to a queue corresponding to the output becoming empty (indicated by transition 324), the output transitions to the "UNCONSTRAINED" state 305. Other embodiments may employ more states having different controlled input rates, especially when the packet switching system provides more detailed flow control information.

FIG. 3B illustrates a data structure 350 which may be used to store a state 361, time 362 and packet count 363 for each of the outputs 0–n (355). The state data element may use enumerated data types, integers or another mechanism to represent the current output state (e.g., "OFF", "UNCONSTRAINED", or "BACKLOGGED"). An average arrival rate for an output 355 may be determined by counting the arrival of packets (stored in count 363) for a time period (determined from time 362). In one embodiment, a count of the number of packets received while the output is in the "OFF" or "BACKLOGGED" state is maintained, and time field 362 is set to the time at which the output last left the "UNCONSTRAINED" state. An average arrival rate can then be readily determined by dividing the value stored in count 363 by the difference of the current time minus the value stored in time 362. In an alternative embodiment, count 363 is periodically set to zero and time 362 is periodically set to the current time so a more recent average arrival rate can be determined. Additionally, some embodiments determine the average arrival rate when needed to make scheduling decisions (so as to provide a pseudo-instantaneous rate), while other embodiments use an average arrival rate which is periodically determined and stored for use in scheduling decisions.

Figure 4A:
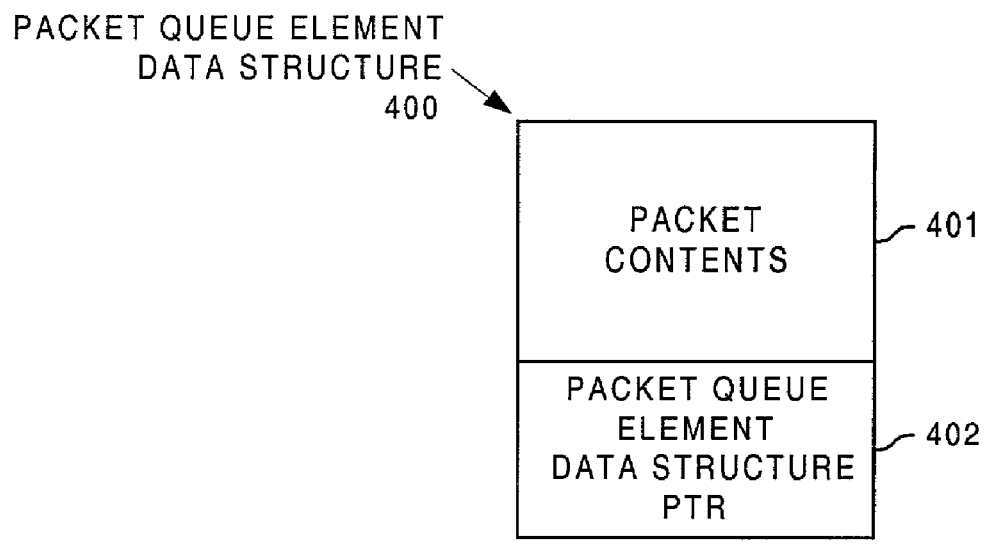
FIGS. 4A–B are block diagrams illustrating a data element and data structure which may be used to maintain a queue for received packets.
Figure 4B:
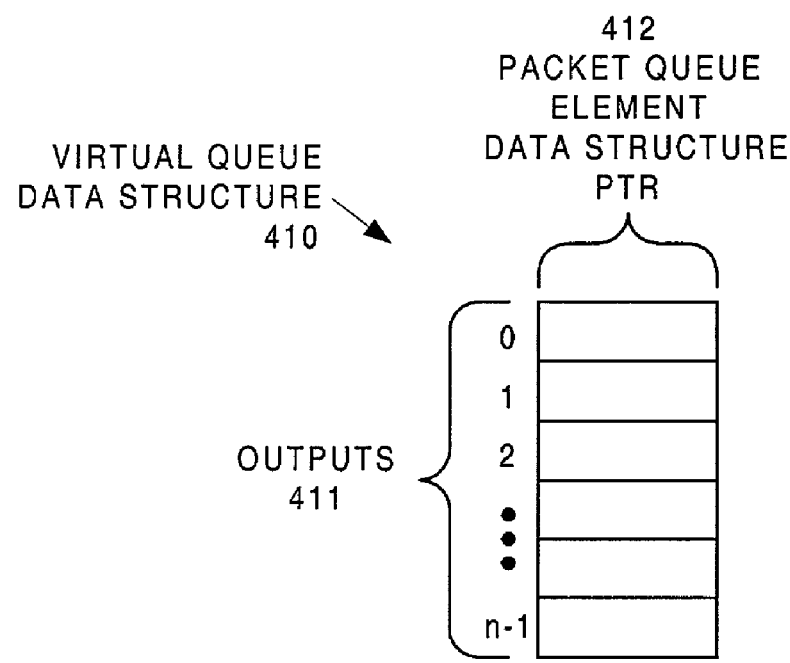

In one embodiment, a virtual packet queue is maintained for each output of the packet switch or switching system to which the component can send. As packets arrive, they are placed in the virtual packet queue, and subsequently retrieved and sent to the output at an appropriate time. FIGS. 4A–B illustrate an embodiment of such a packet queue. FIG. 4A illustrates a packet queue element data structure 400 comprising the packet contents 401, and a linked-list packet queue element data structure pointer 402. Virtual queue data structure 410 (FIG. 4B) implements the queues for each of the n outputs 411 by populating the corresponding packet queue element data structure pointer element 412 with a link-list pointer to one or more packet queue element data structures 400.

When a packet is allowed to be sent to an output, whether the output is in the "UNCONSTRAINED" state or at a scheduled time in the "BACKLOGGED" state, an indicator of the output (or the packet itself, or an indicator of a virtual output queue, etc.) is placed at the tail of a transmit list. These indicators are removed from the transmit list in order, with the corresponding packets sent to the corresponding output. If the output is in a "BACKLOGGED" state and packets remain to be sent, then a new indicator is placed in a scheduling data structure (e.g., a timing wheel).

Figure 5A:
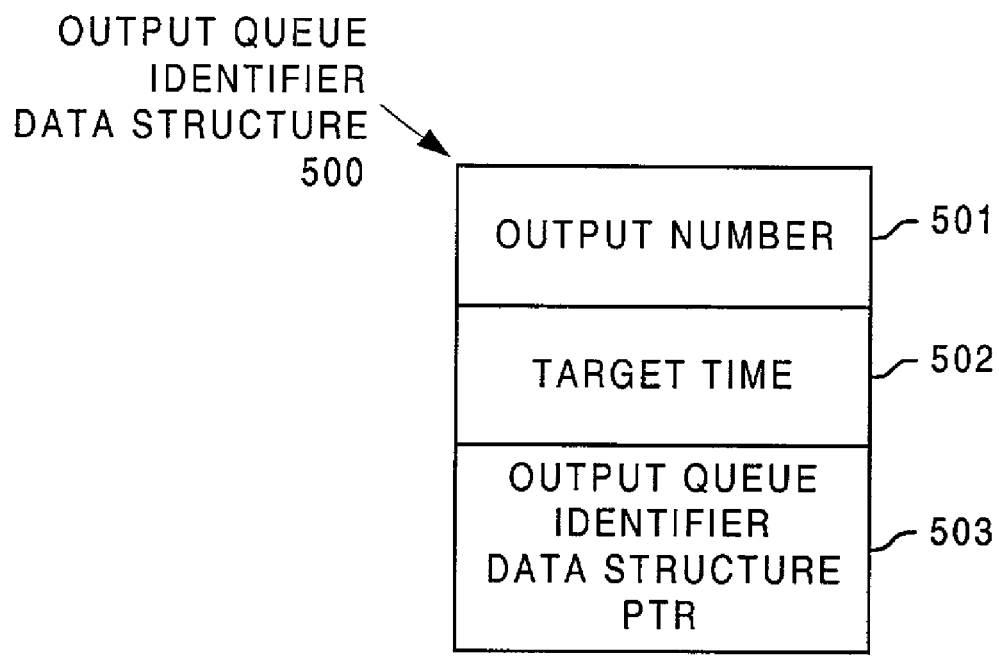
FIGS. 5A–D are block diagrams illustrating a data element and data structure which may be used to schedule packets being sent through a packet switch.
Figure 5B:
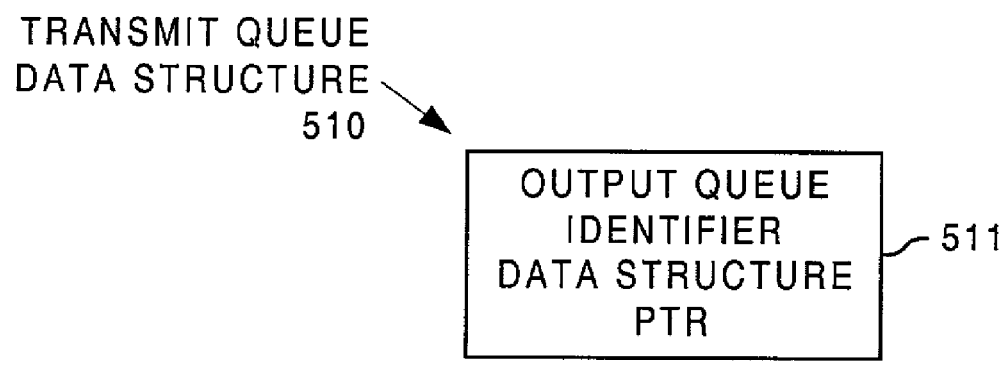

These indicators are re-inserted into the scheduling data structure at a point that will result in packets being sent from each queue at their desired pacing rates. In the preferred embodiment, this is accomplished by computing a target transmission time for each queue when it is being re-inserted into the scheduling data structure and selecting its position in the scheduling data structure using this target transmission time. Successive values of the target transmission time differ from one another by the inter-packet time for the queue. The inter-packet time is the reciprocal of the desired pacing rate for the queue. Alternative embodiments are possible which do not involve the calculation of a target transmission time. Such alternative embodiments are slightly simpler to implement, but the resulting packet transmission rates may differ significantly from the desired pacing rates. FIGS. 5A–B illustrate an embodiment using a linked-list to implement a transmit list. FIG. 5A illustrates an output queue identifier data structure 500 which includes an output number field 501 indicating to which output the identifier corresponds, a target time 502 which corresponds to when the packet is to be sent, and an output queue identifier data structure pointer field 503 for linking additional output queue identifier data structures 500. The transmit list may be then implemented using a transmit queue data structure 510 (FIG. 5B) having output queue identifier data structure pointer 511 which points to zero or more output queue identifier data structure elements 500.

Different embodiments may employ different mechanisms and/or methods to determine a target time for a particular output queue or packet. In one embodiment, an inter-packet time is determined based on the measured average arrival rate (such as that determined using data structure 350 and described herein) and an acceleration factor. For example, if the measured arrival rate was forty percent of the maximum possible packet rate and the acceleration factor is 1.5, then one embodiment uses an inter-packet time of 1.67 (e.g., 1/(1.5*0.40)). Thus, in this example, a packet should be sent every 1.67 packet times (on average) for that particular input-output pair. One embodiments calculates the inter-packet time for each packet to be sent. Another embodiment periodically calculates a new inter-packet time which is used for a predetermined time period, and possibly stored in a data structure.

In the preferred embodiment, a timing mechanism is used which expresses the inter-packet time and target transmission time using fractional portions of a time unit (e.g., a packet time). Every time a packet is sent from a queue, the old value of the target time field 502 is replaced with the old value plus the determined inter-packet time. This allows the system to send packets at rates that closely approximate the desired pacing rates. In other embodiments, the timing mechanism may omit the use of fractional portions in order to simplify the implementation, at the cost of reduced accuracy in the achieved packet transmission rates. Other embodiments may use a variety of methods or mechanisms to determine the new target time, which may include maintaining additional traffic characteristics (e.g., a sent packet count) which then can be used to calculate a new target time.

Once the new target time has been determined, an indicator, such as output queue identifier data structure 500, is then placed into a timing data structure in the bin or slot that is closest to the new target time. This will cause the next packet for the corresponding input-output pair to be sent at close to the correct time. This method/mechanism allows coarse timing wheels, such as those having a granularity of one or multiple packet times, to be used, as the error induced by the timing data structure does not affect scheduling of future packets. Because the successive target times for a queue differ by its inter-packet time, packets are sent out at the desired rate on average, although there may be a significant time variation from packet to packet.

Figure 5C:
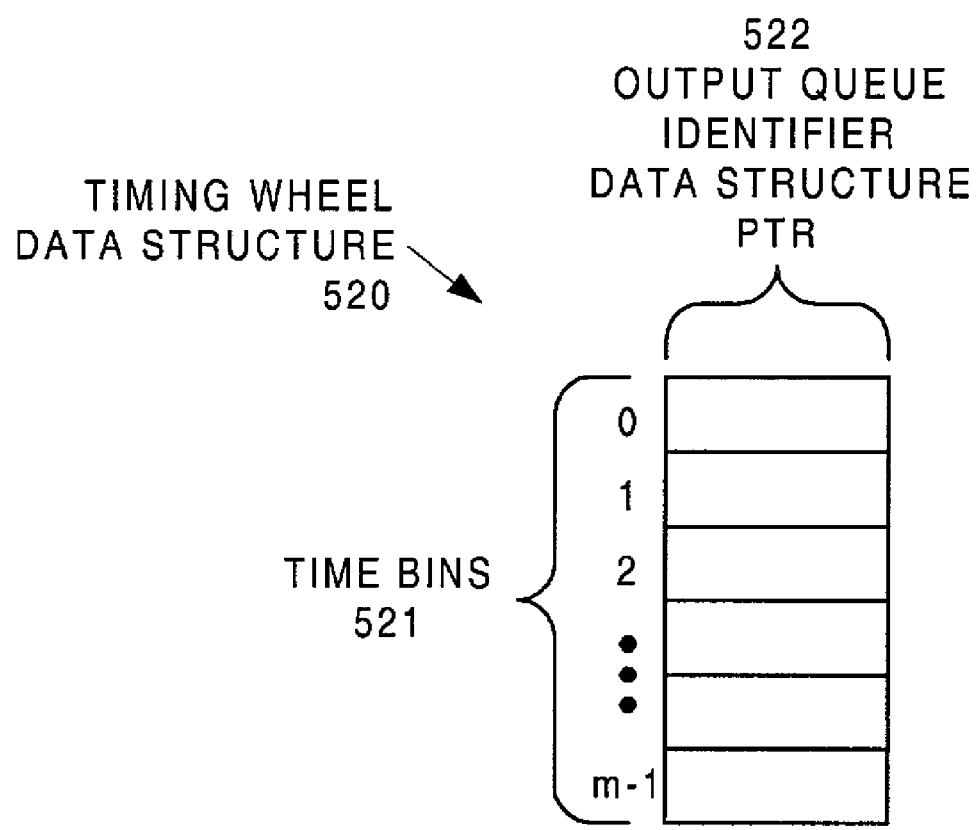
Figure 5D:
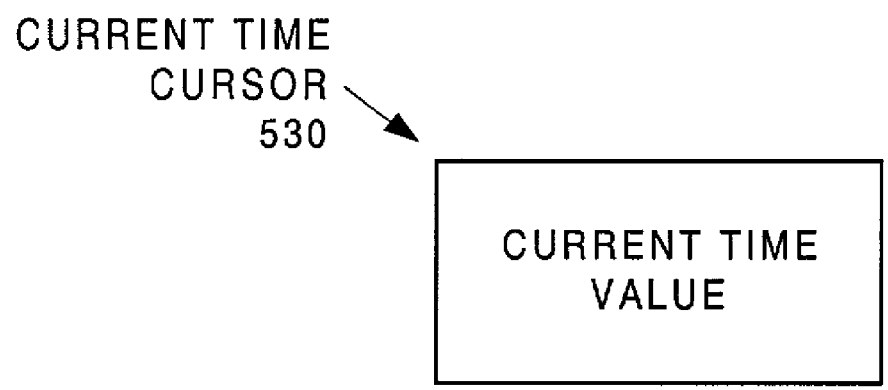

FIGS. 5C–D illustrate an embodiment of a timing wheel implemented using a linked-list data structure. FIG. 5C illustrates a timing wheel data structure 520 having m timing bins 521. An output queue identifier data structure pointer 522, which may point to zero or more output queue identifier data structures 500 (FIG. 5A), is maintained for each timing bin 521. Additionally, a current time cursor 530 (FIG. 5D) is maintained to indicate the current timing bin 521. Current time cursor 530 is typically updated at regular, periodic intervals, such as every packet count or some multiple thereof.

Figure 6:
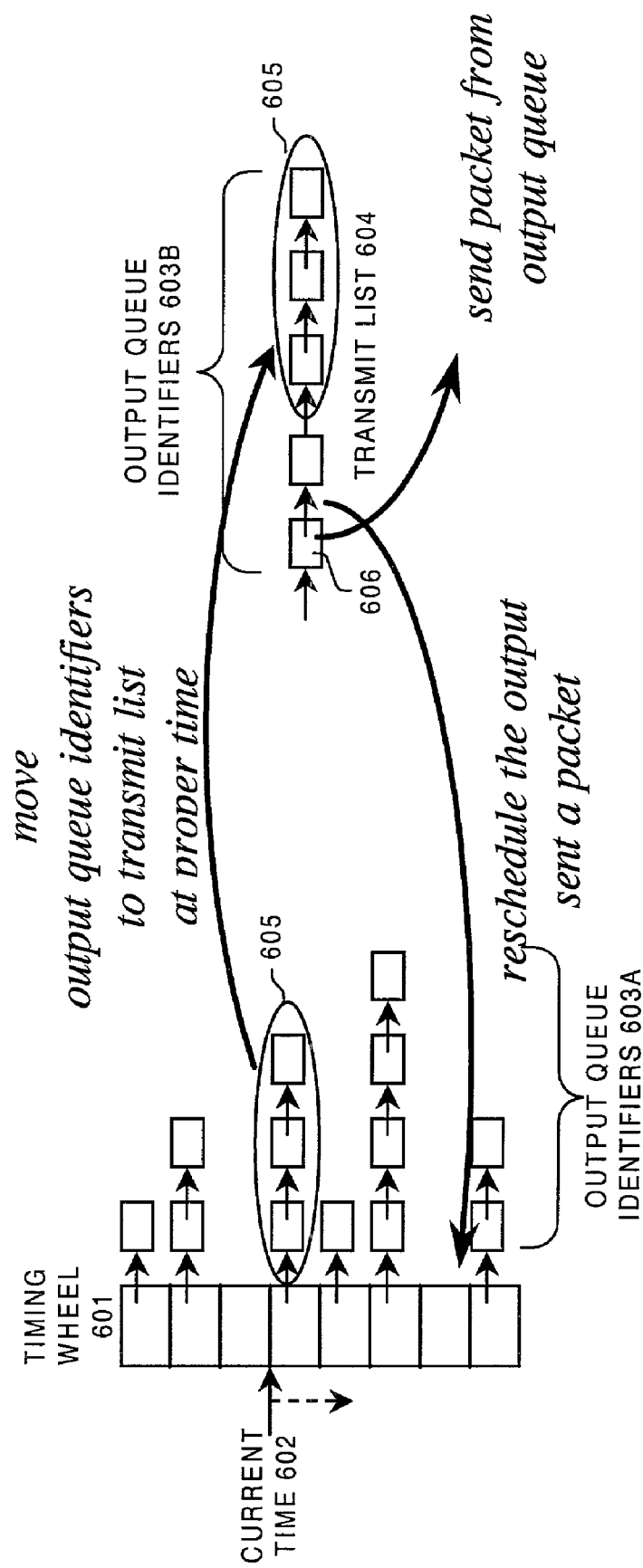
FIG. 6 is an annotated block diagram illustrating the scheduling operation of one embodiment.

FIG. 6 illustrates a timing wheel implemented using the components described in FIGS. 4A–B, and 5A–D. A timing wheel 601 is maintained with the current time indicated by cursor 602. A transmit list 604 is also maintained to indicate outputs which are allowed to be sent a packet, and in which order. In the illustrated embodiment, timing wheel 601 and transmit list 604 both use linked list data structures and include output queue identifier elements 603A and 603B (which may be in the form of output queue identifier data structure 500 illustrated in FIG. 5A).

At the current time indicated by cursor 602, output queue identifier elements 605 are moved from timing wheel 601 to the tail of transmit list 604. In parallel, the output queue identifier element 606 at the head of transmit list 604 is removed and a corresponding packet, stored in a packet queue (not shown) is sent to the corresponding output. If the output is in the "BACKLOGGED" state, the output queue identifier element 606 is rescheduled and placed in timing wheel 601 at an appropriate place corresponding to a next time to send the next packet to the corresponding output. In one embodiment, this next time is proportional to the measured and maintained average packet arrival rate for the output as previously discussed herein.

Figure 7A:
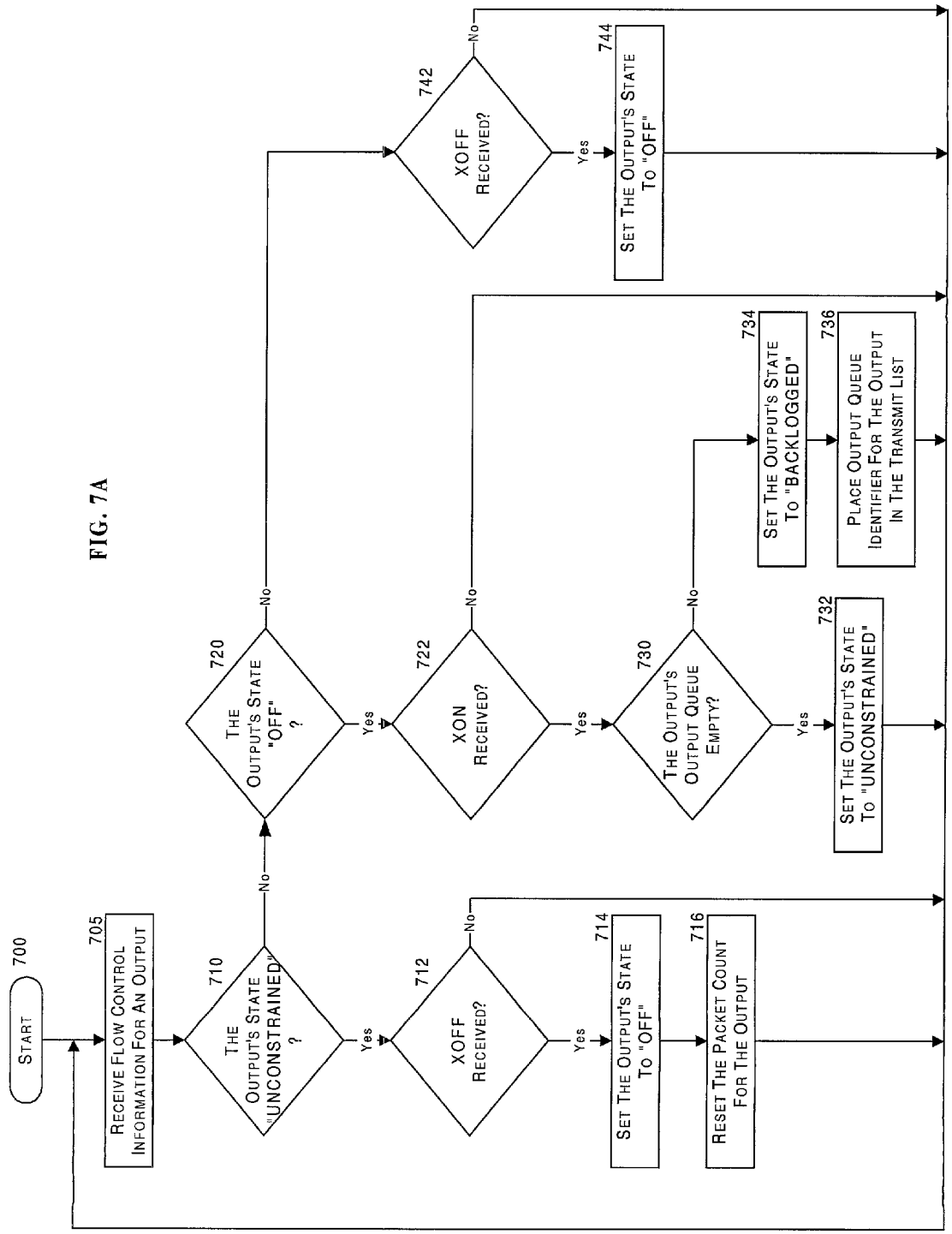
FIG. 7A is a flow diagram illustrating the processing of received flow control information.

One embodiment for maintaining the state of an output in response to received flow control information is illustrated in the flow diagram of FIG. 7A. Processing begins at process block 700 and proceeds to process block 705, where flow control information is received for an output. Next, as determined in process block 710, if the output's current state is "UNCONSTRAINED," then if an XOFF flow control signal is received as determined in process block 712, then the output's state is set to "OFF" in process block 714, and the packet count for the output is reset in process block 716.

Otherwise, as determined in process block 720, if the output's current state is "OFF," then if an XON flow control signal is received as determined in process block 722, then if the output's output queue is empty as determined in process block 730, then the output's state is set to "UNCONSTRAINED" in process block 732. Otherwise, the output's state is set to "BACKLOGGED" in process block 734, and an output queue identifier corresponding to the output is placed in the transmit list in process block 736.

Otherwise, the output is in the "BACKLOGGED" state, and as determined in process block 742, if an XOFF flow control signal is received, then the output's state is set to "OFF" in process block 744.

Processing then returns to process block 705 to receive more flow control information.

Figure 7B:
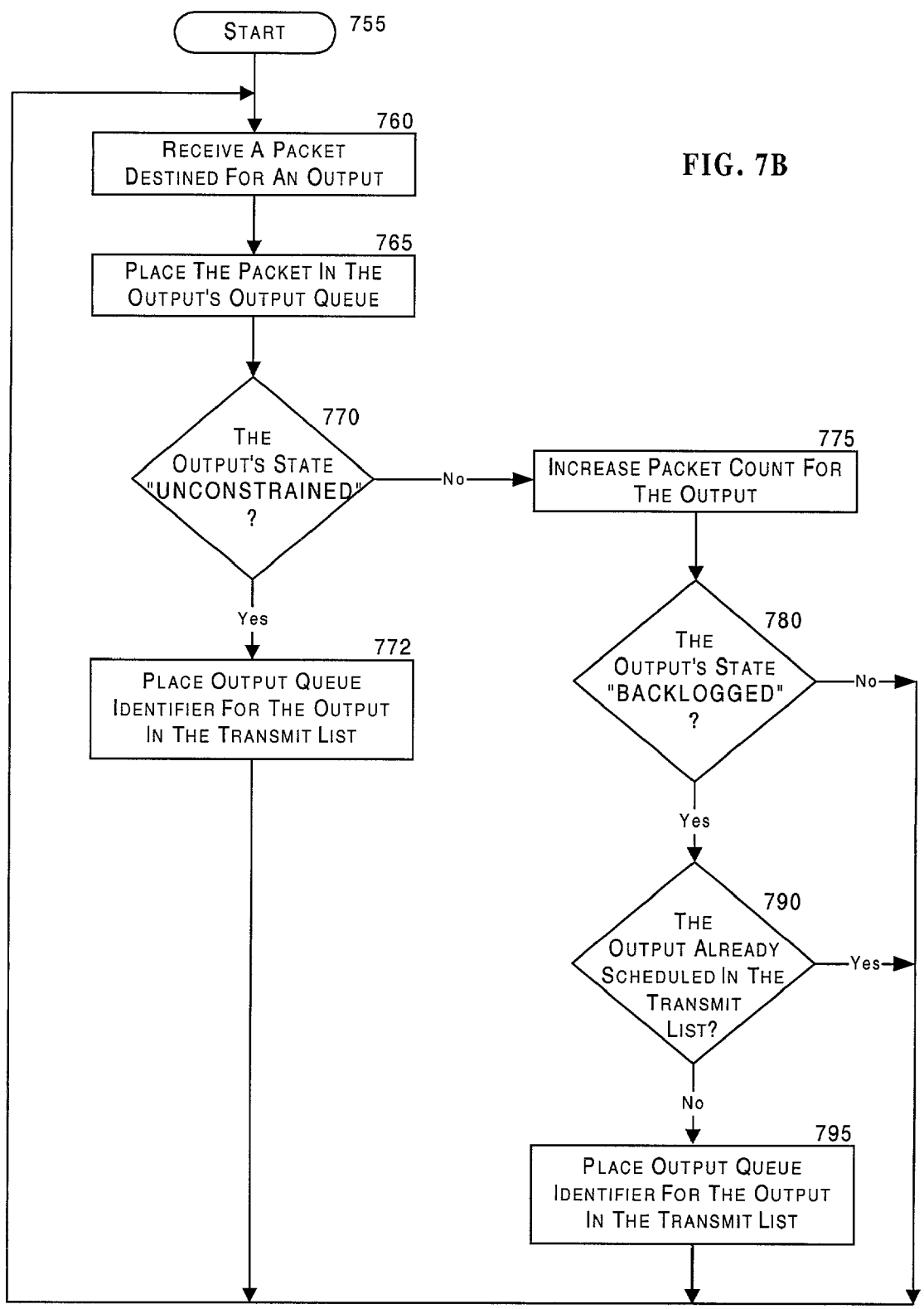
FIG. 7B is a flow diagram illustrating the processing of received packets.

The operation of one embodiment in response to a received packet is illustrated in FIG. 7B. Processing begins at process block 755, and proceeds to process block 760 where a packet destined for a particular output is received. Next, in process block 765, the received packet is placed in an output queue corresponding to the output destination of the received packet. Next, as determined in process block 770, if the current state of the output is "UNCONSTRAINED," then an output queue identifier is placed in the transmit list in process block 772.

Otherwise, the packet count is increased for the output in process block 775. Then, as determined in process block 780, if the output's current state is "BACKLOGGED," then if the output is not already scheduled in the transmit list as determined in process block 790, then an output queue identifier is placed at the end of the transmit list in process block 795.

Processing then returns to process block 760 to receive more packets.

Figure 8:
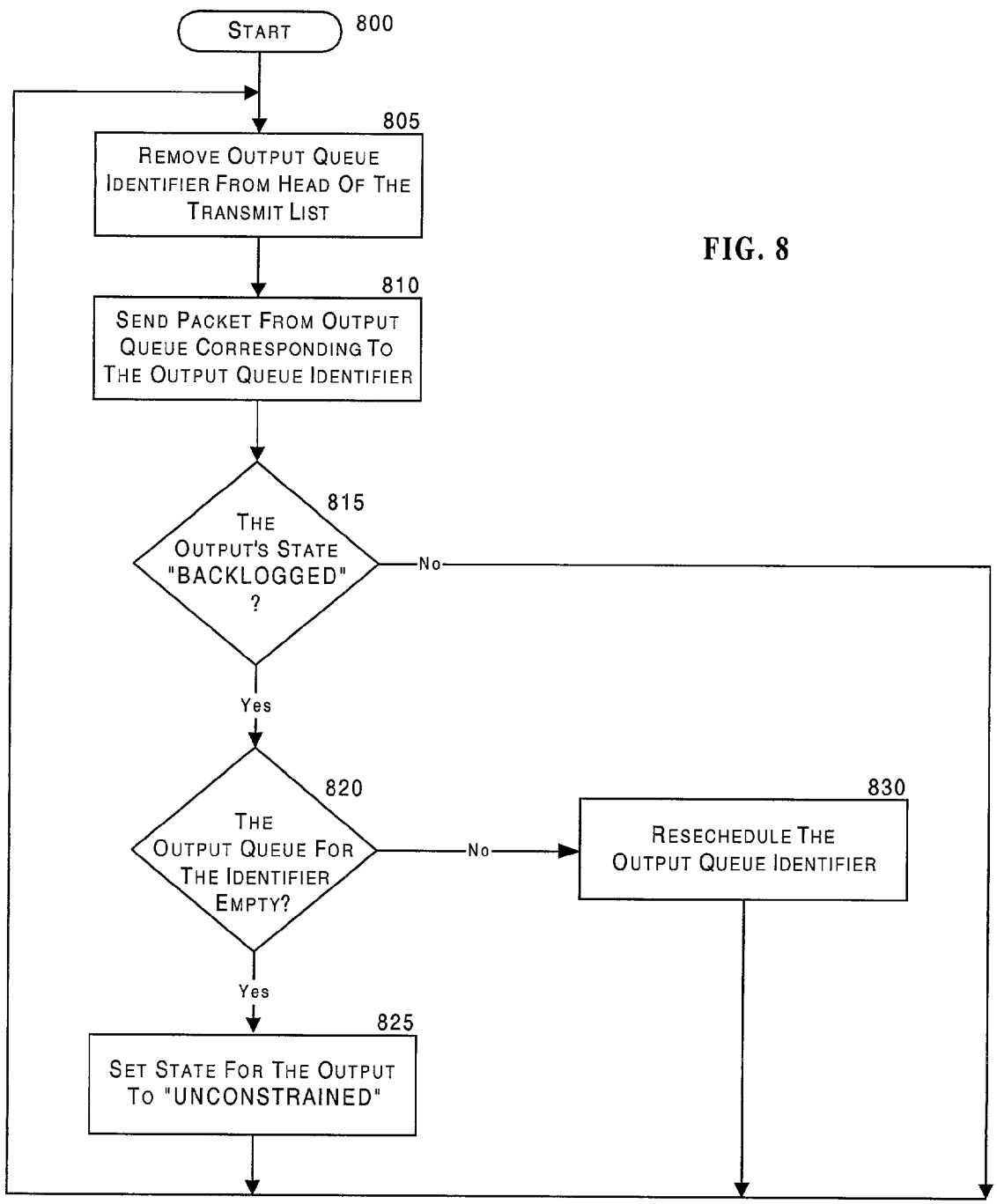
FIG. 8 is a flow diagram illustrating the scheduling and sending of packets to outputs of an embodiment system.

The operation of an embodiment for processing the transmit list is illustrated in FIG. 8. Processing begins at process block 800, and proceeds to process block 805, where an output queue identifier is removed from the head of the transmit list. Next, in process block 810, a packet is retrieved from the head of the indicated output queue and sent to the output. Next, as determined in process block 815, if the output's state is "BACKLOGGED", then, if the output queue corresponding to the output just sent a packet is empty as determined in process block 820, then the output's state is set to "UNCONSTRAINED" in process block 825. Otherwise, the output queue identifier is rescheduled in process block 830.

Processing then returns to process block 805 to send more packets.

For simplicity of understanding, some embodiments have been described herein using one type of data structures and/or elements. Typically, these data structures and elements have been described in the form of a linked list. As is apparent to one skilled in the art, numerous other embodiments are possible which use one or more of a wide variety of data structures and elements in keeping with the scope and spirit of the invention.

In the foregoing specification, the invention has been described with reference to specific exemplary embodiments thereof. It will, however, be evident that various modifications and changes maybe made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a plurality of rate monitors to measure the rate at which traffic arrives for each of a plurality of outputs of a packet switching system;
   one or more state data structures indicating a state of each of the plurality of outputs of the packet switching system; and
   a rate-controlled virtual output queue for each of the plurality of outputs of the packet switching system, each of the rate controlled virtual output queues adjusting a rate at which packets are sent to a particular destination based at least in part on the measured traffic arrival rate for the particular destination and the state for the particular destination;
   wherein the one or more state data structures maintains an indication of one of at least three different states for each of the plurality of outputs of the packet switching system; and
   wherein packets are not sent to a particular output when the particular output is in a first state, packets are sent to the particular output at approximately the measured traffic arrival rate when the particular output is in a second state, and packets are sent to the particular output at a reduced rate approximately proportional to the measured traffic arrival rate when the particular output is in a third state.

2. An input line card comprising the apparatus of claim 1.

3. The apparatus of claim 1, wherein each of the rate-controlled virtual output queues includes a transmit list.

4. The apparatus of claim 1, wherein each rate-controlled virtual output queue includes a timing mechanism.

5. The apparatus of claim 1, wherein each of the plurality of rate monitors include one or more data structures maintaining an indication of a packet count and a reference time period.

6. The apparatus of claim 5, wherein the timing mechanism includes one or more timing wheels.

7. The apparatus of claim 5, wherein the rate-controlled virtual output queue comprises at least one scheduling data structure, said at least one scheduling data structure including scheduling information with a timing granularity greater than that of the timing mechanism.

8. The apparatus of claim 6, wherein the one or more state data structures maintains an indication of one of at least three different states for each of the plurality of outputs of the packet switching system.

9. The apparatus of claim 7, wherein said scheduling information includes a target time for sending a next packet.

10. A method performed by a packet switching system, the method comprising:
receiving packets at a first component of the packet switching system, at least a subset of the received packets being destined for a second component of the packet switching system;
maintaining a state data structure indicating a state of the second component;
maintaining a rate data structure reflective of an arrival rate at which packets destined for the second component are received at the first component;
sending received packets to the second component at a first rate approximately proportional to the arrival rate when the state data structure indicates the second component is in a first state; and
sending received packets to the second component at a second rate less than the first rate and greater than zero, and approximately proportional to the arrival rate when the state data structure indicates the second component is in a second state.

11. The method of claim 10, wherein the first rate is approximately the arrival rate of the received packets.

12. The method of claim 10, wherein the rate data structure includes a count of a subset of the received packets.

13. The method of claim 10, wherein a set of possible states for the state of the second component includes an unconstrained state, an off state, and a backlogged state.

14. The method of claim 13, further comprising sending no received packets to the second component from the first component when the state data structure indicates the second component is in an off state.

15. A method performed by a packet switching system, the method comprising:
receiving a plurality of packets, each of the received plurality of packets being destined for one or more of a plurality of outputs of the packet switching system;
measuring a traffic arrival rate for each one of the plurality of outputs of the packet switching system, the traffic arrival rate reflective of the rate at which traffic arrives for a corresponding one of the plurality of outputs of the packet switching system;
maintaining an indication of a state of said each one of the plurality of outputs of the packet switching system;
sending received packets to a particular one of the plurality of outputs at a first rate approximately proportional to the measured traffic arrival rate for the particular one of the plurality of outputs when the maintained state indication reflects the particular one of the plurality of outputs is in a first state; and
sending received packets to the particular one of the plurality of outputs at a second rate less than the first rate and greater than zero, and approximately proportional to the measured traffic arrival rate for the particular one of the plurality of outputs when the maintained state indication reflects the particular one of the plurality of outputs is in a second state.

16. The method of claim 15, wherein no packets are sent to a particular one of the plurality of outputs when the maintained state indication reflects the particular one of the plurality of outputs is in a third state.

17. The method of claim 15, wherein said indications of said states of the plurality of outputs are updated based on received flow control information.

18. The method of claim 15, wherein said method is performed by an input line card of the packet switching system.

19. The method of claim 15, wherein measuring the traffic arrival rate includes maintaining a packet count and a time reference.

20. The method of claim 15, further comprising:
maintaining a packet queue for each output of the packet switching system; and
placing each packet of the plurality of received packets in one of the plurality of packet queues based on a destination of said each packet.

21. The method of claim 20, further comprising placing an indicator of a corresponding one of the plurality of packet queues in a transmit list upon arrival of a particular received packet having a destination of a selected one of the plurality of outputs being in the first state.

22. The method of claim 15, wherein sending received packets to the particular one of the plurality of outputs at the second rate includes:
sending one of the plurality of packets to the particular one of the plurality of outputs of the packet switching system; and
rescheduling the particular one of the plurality of outputs of the packet switching system in a timing data structure for a second scheduled time based upon the measured traffic arrival rate for the selected output.

23. The method of claim 22, wherein sending received packets to the particular one of the plurality of outputs at the second rate includes retrieving a transmit indication corresponding to the particular one of the plurality of outputs of the packet switching system from the timing data structure at a first scheduled time.

24. The method of claim 22, wherein the second scheduled time reflects an actual time to send one of the plurality of packets to the selected output of the packet switching system rather than a time relative to a last sent packet to the selected output of the packet switching system.

25. The method of claim 22, wherein the timing data structure includes one or more timing wheels.

26. The method of claim 22, comprising maintaining a target time for the sending one of the plurality of packets, wherein the second scheduled time is approximately the target time.

27. The method of claim 26, wherein the target time has a finer timing resolution than that of the timing data structure.

28. The method of claim 15, wherein sending received packets to the particular one of the plurality of outputs at the second rate includes:
retrieving a transmit indication corresponding to a selected output of the plurality of outputs of the packet switching system from a timing data structure at a first scheduled time and placing the retrieved transmit indication in a transmit list;
removing the retrieved transmit indication from the transmit list and sending one of the plurality of packets to the corresponding selected output of the plurality of outputs of the packet switching system based on the retrieved transmit indication; and rescheduling the sending one of the plurality of packets to the corresponding selected output of the plurality of outputs of the packet switching system in the timing data structure for a second scheduled time based upon the measured traffic arrival rate for the selected output.

29. The method of claim 28, wherein the rescheduling process occurs after the transmit indication is removed from the transmit list.

30. The method of claim 28, wherein the second scheduled time reflects an actual time to send one of the plurality of packets to the selected output of the packet switching system rather than a time relative to a last sent packet to the selected output of the packet switching system.

31. A packet switch system, comprising:
  means for receiving packets at a first component of the packet switching system, at least a subset of the received packets being destined for a second component of the packet switching system;
  means for maintaining a state data structure indicating a state of the second component;
  means for maintaining a rate data structure reflective of an arrival rate at which packets destined for the second component are received at the first component;
  means for sending received packets to the second component at a first rate approximately proportional to the arrival rate when the state data structure indicates the second component is in a first state; and
  means for sending received packets to the second component at a second rate less than the first rate and greater than zero, and approximately proportional to the arrival rate when the state data structure indicates the second component is in a second state.

32. The packet switch system of claim 31, wherein the first rate is approximately the arrival rate of the received packets.

33. The packet switch system of claim 31, wherein the rate data structure includes a count of a subset of the received packets.

34. The packet switch system of claim 31, wherein a set of possible states for the state of the second component includes an unconstrained state, an off state, and a backlogged state.

35. The packet switch system of claim 34, further comprising means for sending no received packets to the second component from the first component when the state data structure indicates the second component is in an off state.

36. A machine-readable medium having stored thereon data representing sequences of instructions, said sequences of instructions which, when executed by a processor, cause said processor to perform the following:
  receiving packets at a first component of the packet switching system, at least a subset of the received packets being destined for a second component of the packet switching system;
  maintaining a state data structure indicating a state of the second component;
  maintaining a rate data structure reflective of an arrival rate at which packets destined for the second component are received at the first component;
  sending received packets to the second component at a first rate approximately proportional to the arrival rate when the state data structure indicates the second component is in a first state; and
  sending received packets to the second component at a second rate less than the first rate and greater than zero, and approximately proportional to the arrival rate when the state data structure indicates the second component is in a second state.

37. The machine readable medium of claim 36, wherein a set of possible states for the state of the second component includes an unconstrained state, an off state, and a backlogged state.

38. The machine readable medium of claim 37, wherein said processor further performs sending no received packets to the second component from the first component when the state data structure indicates the second component is in an off state.

* * * * *

UNITED STATES PATENT AND TRADEMARK OFFICE
CERTIFICATE OF CORRECTION

PATENT NO. : 7,012,889 B1  Page 1 of 1
APPLICATION NO. : 09/705450
DATED : March 14, 2006
INVENTOR(S) : Turner et al.

It is certified that error appears in the above-identified patent and that said Letters Patent is hereby corrected as shown below:

Col. 3, line 56, replace "time to" with -- time $t_0$ --

Col. 3, line 67, replace "setting to" with -- setting $t_0$ --

Col. 12, line 66, replace "claim 5" with -- claim 4 --

Col. 13, line 1, replace "claim 5" with -- claim 4 --

Col 13, line 6, replace "claim 6" with -- claim 7 --

Signed and Sealed this

Fourteenth Day of November, 2006

JON W. DUDAS
*Director of the United States Patent and Trademark Office*